(12) United States Patent
Hales et al.

(10) Patent No.: US 9,090,950 B2
(45) Date of Patent: Jul. 28, 2015

(54) ABNORMAL GRAIN GROWTH SUPPRESSION IN ALUMINUM ALLOYS

(75) Inventors: Stephen J Hales, Newport News, VA (US); Harold Dale Claytor, Newport News, VA (US); Joel A. Alexa, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 806 days.

(21) Appl. No.: 13/272,027

(22) Filed: Oct. 12, 2011

(65) Prior Publication Data

US 2012/0090738 A1    Apr. 19, 2012

Related U.S. Application Data

(60) Provisional application No. 61/392,584, filed on Oct. 13, 2010, provisional application No. 61/445,741, filed on Feb. 23, 2011, provisional application No. 61/447,162, filed on Feb. 28, 2011.

(51) Int. Cl.
| | |
|---|---|
| *C22F 1/04* | (2006.01) |
| *B32B 15/01* | (2006.01) |
| *C21D 9/50* | (2006.01) |
| *C22C 21/10* | (2006.01) |
| *C22C 21/12* | (2006.01) |

(52) U.S. Cl.
CPC . *C21D 9/50* (2013.01); *C22C 21/10* (2013.01); *C22C 21/12* (2013.01); *C22F 1/04* (2013.01)

(58) Field of Classification Search
USPC ........................................ 228/112.1; 148/535
IPC ................. C22F 1/04,1/053, 1/057; C21D 9/50
See application file for complete search history.

(56) References Cited

U.S. PATENT DOCUMENTS

| | | | |
|---|---|---|---|
| 4,915,747 A | 4/1990 | Cho | |
| 4,921,548 A | 5/1990 | Cho | |
| 4,927,470 A | 5/1990 | Cho | |
| 4,946,517 A | 8/1990 | Cho | |
| 5,066,342 A | 11/1991 | Rioja et al. | |
| 5,198,045 A | 3/1993 | Cho | |

(Continued)

OTHER PUBLICATIONS

Heat Treating, vol. 4, ASM Handbook, ASM International, 1991, p. 1, 2, 14.*

(Continued)

*Primary Examiner* — Roy King
*Assistant Examiner* — Janelle Morillo
(74) *Attorney, Agent, or Firm* — Jennifer L. Riley; Thomas K. McBride

(57) ABSTRACT

The present invention provides a process for suppressing abnormal grain growth in friction stir welded aluminum alloys by inserting an intermediate annealing treatment ("IAT") after the welding step on the article. The IAT may be followed by a solution heat treatment (SHT) on the article under effectively high solution heat treatment conditions. In at least some embodiments, a deformation step is conducted on the article under effective spin-forming deformation conditions or under effective superplastic deformation conditions. The invention further provides a welded article having suppressed abnormal grain growth, prepared by the process above. Preferably the article is characterized with greater than about 90% reduction in area fraction abnormal grain growth in any friction-stir-welded nugget.

9 Claims, 7 Drawing Sheets

(56) References Cited

U.S. PATENT DOCUMENTS

| | | | |
|---|---|---|---|
| 5,389,165 | A | 2/1995 | Cho |
| 6,562,154 | B1 | 5/2003 | Rioja |
| 6,660,106 | B1 * | 12/2003 | Babel et al. ................ 148/527 |
| 7,229,509 | B2 | 6/2007 | Cho |
| 7,490,752 | B2 | 2/2009 | Ehrstrom |
| 2006/0054252 | A1 * | 3/2006 | Sankaran et al. ............. 148/535 |
| 2009/0159159 | A1 | 6/2009 | Danielou |

OTHER PUBLICATIONS

I. Andersen, O. Grong and N. Ryum, "Analytical modeling of grain growth in metals and alloys in the presence of growing and dissolving precipitates-II Abnormal grain growth", Acta Metall. Mater., vol. 43, pp. 2689-2700, 1995.

A. Brahme, J. Fridy, H. Weiland and A.D. Rollett, "Modeling texture evolution during recrystallization in aluminum", Modeling Simul. Mater. Sci. Eng., vol. 17, pp. 1-20, 2009.

I. Charit and R.S. Misra, "Abnormal grain growth in friction stir processed alloys", Scripta Materialia, vol. 58, pp. 367-371, 2008.

P.S. Chen and B.N. Bhat, "Time-temperature-precipitation behavior in Al—Li alloy 2195", NASA TM-2002-211548, Marshall Space Flight Center, Huntsville, AL, Feb. 2002.

R.D. Doherty, Li-C. Chen and I. Samajdar, "Cube recrystallization texture-experimental results and modeling" Mater. Sci. Engng., vol. A257, pp. 18-36, 1998.

J.C. Feng, Y.C. Chen and H.J. Liu, "Effects of post-weld heat treatment on microstructuyre and mechanical properties of friction stir welded joints in 2219-O aluminum alloy", J. Mat. Sci. & Tech., vol. 22, pp. 86-90, 2006.

KH. A.A. Hassan, A.F. Norman, D.A. Price, P.B. Prangnell, "Stability of Nugget Zone Grain Structures in High Strength Al-alloy Friction Stir Welds during Solution Treatment", Acta Materialia, vol. 51, pp. 1923-1936, 2003.

J.E. Hatch (ed.) "Metallurgy of heat treatment", in Aluminum-Properties and Physical Metallurgy, ASM, Metals Park, OH, Ch. 5, pp. 134-199, 1984.

F.J. Humphreys and M. Hatherly, "Abnormal grain growth", Recrystallization and Related Annealing Phenomena, Elsevier, UK, pp. 314-325, 1995.

K.V. Jata and S.L. Semiatin, "Continuous dynamic recrystallization during friction stir welding of high strength aluminum alloys", Scripita Materiala, vol. 43, pp. 743-749, 2000.

T.H. Sanders and E.A. Starke, "The physical metallurgy of aluminum-lithium alloys—a review", in Aluminum-Lithium Alloys, T.H. Sanders and E.A. Starke (eds.), MCEP Ltd., Birmingham (UK), vol. 1, pp. 1-37, 1989.

A. Waheed and G.W. Lorimer, "Pinning of subgrain boundaries by Al3Zr dispersoids during annealing in Al—Li commerical alloys", Mater. Sci. Lett., vol. 16, pp. 1643-1646, 1997.

* cited by examiner

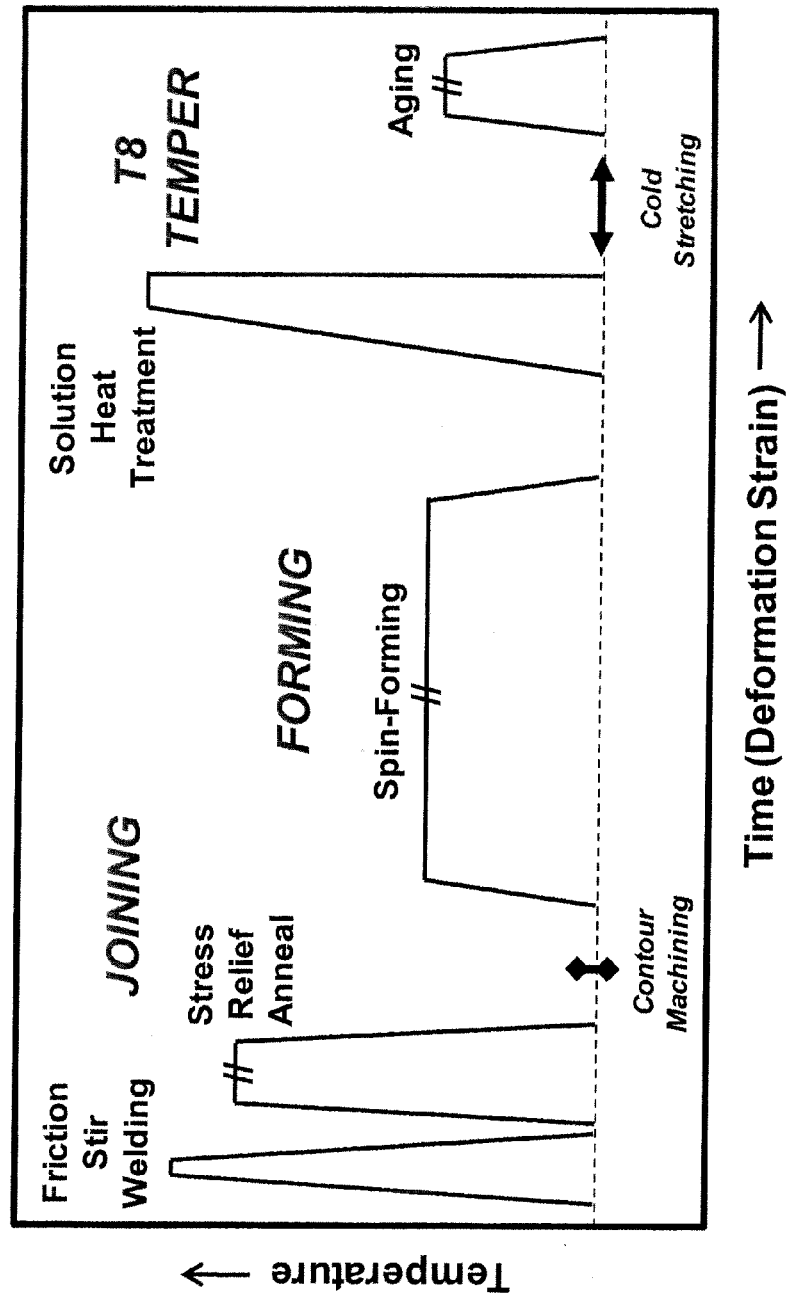
Figure 1: Known Art.

ABNORMAL GRAIN GROWTH SUPPRESSION IN ALUMINUM ALLOYS

CROSS-REFERENCE TO RELATED APPLICATIONS

This patent application claims the benefit of U.S. Provisional Patent Application Nos. 61/392,584, filed Oct. 13, 2010; 61/445,741, filed Feb. 23, 2010; and 61/447,162, filed Feb. 28, 2011.

STATEMENT REGARDING FEDERALLY SPONSORED RESEARCH AND DEVELOPMENT

This invention was made in part with Government support under Contract/Grant Number NNL07 AA00B awarded by the National Aeronautics and Space Administration. The Government may have certain rights in this invention.

BACKGROUND OF THE INVENTION

Friction stir welding (FSW) is a relatively new welding technique and has been used mainly for aluminum alloys in the transportation industry, in applications such as automobiles, railway vehicles, ships, and rockets. Effective friction stir welding conditions are known to the art. In one instance, prototype end domes for cryogenic tanks were fabricated using friction stir welding and spin forming deformation (SFD) (under spin forming deformation conditions, which are also known to the art). Subsequent heat treatment under effective solution heat treatment conditions to a high strength temper resulted in weldment properties that were below specifications. The weldment had reduced strength, fracture toughness, and/or ductility due to undesirably large grains. Abnormal grains can be detrimental to such notch-sensitive mechanical properties. Accordingly, a need exists for new treatments to improve weldment properties in manufactured articles.

BRIEF SUMMARY OF THE INVENTION

The present invention meets the need by providing such treatments. The microstructural reason for abnormal grain growth was identified and a modified heat treatment procedure was developed to alleviate the problem. Metallurgical analyses established that a post-forming, pre-solution treatment annealing treatment was effective in substantially suppressing abnormal grain growth in aluminum alloys.

In view of the foregoing, it is an object of the invention to provide a process for suppressing abnormal grain growth in friction stir welded aluminum alloys.

It is a related object of the invention to provide the ability to prepare a welded article having good strength and ductility because of fine grain microstructure based upon significantly suppressed abnormal grain growth.

These objects are achieved by the present invention, which provides a process for suppressing abnormal grain growth in welded aluminum alloys by starting with an article comprising an aluminum alloy and then friction-stir-welding the article under effective friction-stir-welding conditions. Next, an intermediate annealing treatment ("IAT") after the welding step on the article is conducted under effective intermediate annealing conditions, followed by a solution heat treatment (SHT) on the article under effectively high solution heat treatment conditions. In at least some embodiments, a deformation step is conducted on the article under under effective spin-forming deformation conditions or under effective superplastic deformation conditions.

The invention further provides a welded article having suppressed abnormal grain growth, prepared by a process including the steps of providing an article comprising an aluminum alloy, of friction-stir-welding the article under effective friction-stir-welding conditions, and of inserting an intermediate annealing treatment ("IAT") after the welding step on the article under effective intermediate annealing conditions comprising an effective time period and an IAT temperature lower than a solidus line on a phase diagram for the aluminum alloy. The article is finished with the steps of conducting solution heat treatment on the article under effective solution heat treatment conditions and of recovering the article characterized with greater than about 90% reduction in area fraction abnormal grain growth in any friction-stir-welded nugget.

Additional objects, embodiments and details of this invention can be obtained from the following detailed description of the invention.

BRIEF DESCRIPTION OF THE SEVERAL VIEWS OF THE DRAWING(S)

FIG. 1 is a schematic illustration of one known thermo-mechanical processing route for manufacturing of alloy 2195 spin-formed domes.

FIGS. 2 (*a*) and (*b*) illustrate exemplary T8 temper processing of friction-stir-welded and spin-formed alloy 2195 material; where FIG. 2 (*a*) shows thickness of weld nugget relative to the original plate, and FIG. 2 (*b*) shows extensive abnormal grain growth caused by exposure to the solution heat treatment temperature after spin-forming deformation.

FIGS. 3 (*a*)-(*d*) show exemplary welded nugget microstructural characteristics following solution heat treatment; where FIGS. 3 (*a*)-(*d*) show the progressive reduction of abnormal grain growth with IAT treatment.

FIGS. 4 (*a*) and (*b*) display an exemplary series of Barker's etch/cross-polarized images showing the effect of the post-SFD/pre-SHT intermediate annealing treatment on the grain structure in the weld nugget cross-section; where FIG. 4 (*a*) shows images at the beginning of the IAT, and FIG. 4 (*b*) shows images at the conclusion of the IAT.

FIGS. 5 (*a*) and (*b*) shows exemplary mean linear intercept (MLI)/average dimensions data illustrating the effect of the intermediate annealing treatment (IAT) on grain and subgrain size, determined along 'AR to RC' traverses of the weld nugget; where FIG. 5 (*a*) is at the beginning, and FIG. 5 (*b*) is at the conclusion of the IAT.

DETAILED DESCRIPTION OF THE INVENTION

Figures 2A, 2B:
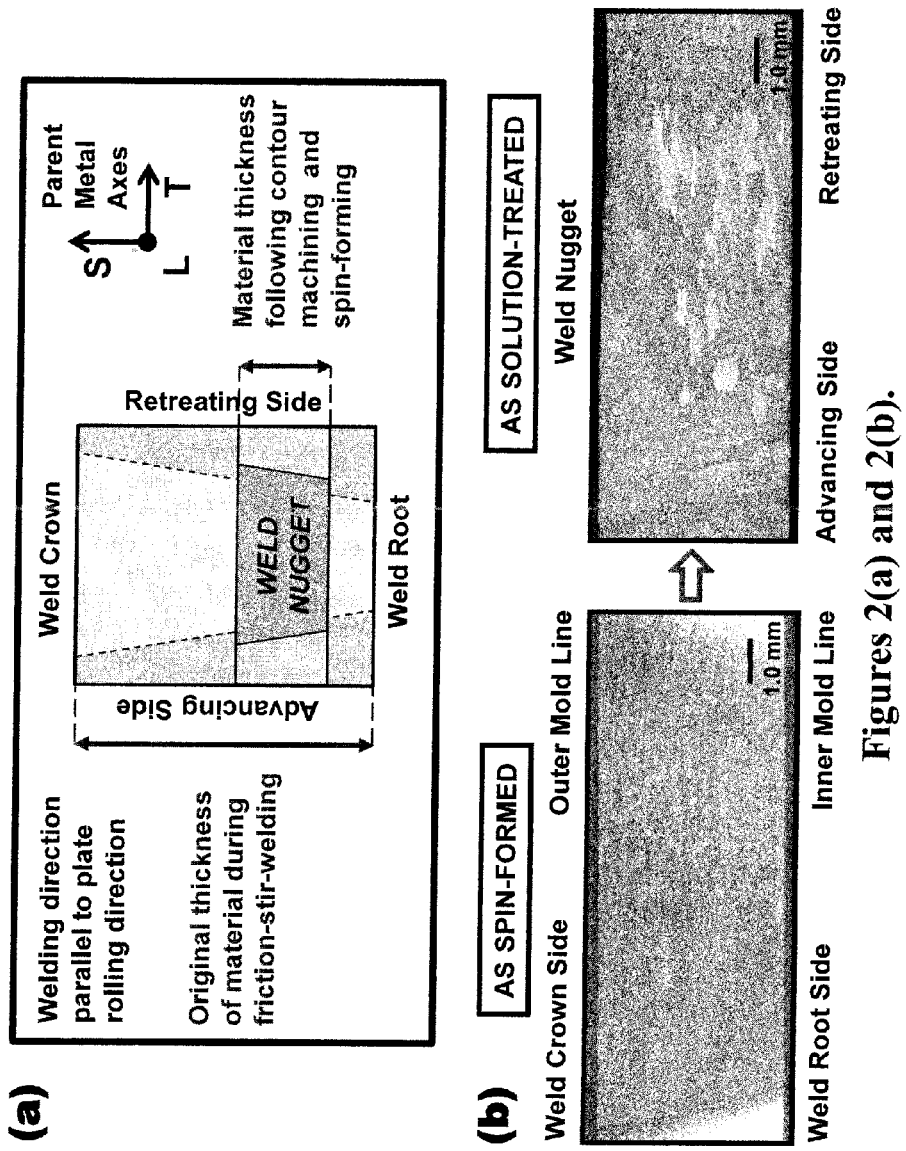

In at least one embodiment of the invention, the combination of friction-stir-welding (FSW) and spin-forming deformation (SFD) technologies has been explored as a manufacturing route for the domes on cryogenic tanks. This approach requires post-fabrication processing of the Al—Li alloy 2195 to a high strength condition for service. Processing to this T8 temper includes solution heat treatment (SHT), cold stretching and aging of the material. Undesirable abnormal grain growth (AGG) occurs within the weld nugget during the SHT phase. The presence of such oversized grains is a concern with regards to damage tolerance and structural integrity. The approach adopted was to suppress AGG by inserting an intermediate annealing treatment (IAT) between SFD and SHT operations. The IAT design constituted a merger between traditional processing protocols, microstructural stability concepts, and inhomogeneous grain structures. This investigation culminated in a prolonged recovery heat treatment which significantly reduced AGG within the weld nugget. In this study, quantitative metallography was used to judge the effectiveness of the IAT and provide insight on the microstructural mechanisms responsible. Adoption of this procedure improves the potential to apply this combination of technologies to the fabrication of various articles, including, e.g. cryogenic tanks on future launch vehicles, as well as other articles of aluminum alloy known for various applications.

The invention described herein has application to many types of aluminum alloys, including Al—Zn—Cu—Mg alloys (7xxx series) and Al—Cu—Mg alloys (2xxx series), as well as Al—Cu—Mg—Li alloys with high lithium content (above about 1.2%) and to alloys of the 6xxx series. The invention is also believed to have application to the automotive and marine industries which use 5xxx alloys. The invention is also believed applicable to pseudo-6xxx alloys that are 5xxx alloys with small solute additions that provide increased strength, for example, during the "paint bake" cycle of sheet fabrication in the auto industry, wherein artificial aging is conducted prior to SHT. In preferred embodiments, particularly for 2xxx series alloys containing fugitive solute elements, including for example, and without limitation, lithium, in certain embodiments benefit even further from IAT treatment under inert gas conditions. Inert gases may be selected from any known to be effective, including nitrogen and/or noble gases, taken alone and/or in combination with each other.

Two prior thermal processing research work efforts were used to investigate effective IAT conditions. The first is the work performed by Alcoa to produce isotropic Al—Li rolled product (AF458). See for example, U.S. Pat. Nos. 5,066,342 and 6,562,154, both of which are herein incorporated by reference in their entirety by reference thereto. The second is the work performed by Alcan to eliminate AGG during SHT of FSW'd 7xxx alloys. See for example, U.S. Pat. No. 7,490,752, and U.S. Published Patent Application No. 2009/0159159, both of which are herein incorporated by reference in their entirety by reference thereto. The Alcoa and Alcan work displayed effective SHT conditions in many instances, but failed to recognize the advantages of an inserted IAT treatment as provided by the instant invention.

The Alcoa approach used traditional processing protocols. The primary solute in alloy 2195 is 4 wt. pct. Cu, and the Al—Cu binary diagram can be employed as a convenient guide. The solid solution solvus line is a particular type of line on the phase diagram. It is hereafter referred to as the solvus line. Above it, all of the Cu-containing precipitates dissolve and the alloy enters a (quasi)single phase region ($Al_3Zr$ dispersoids remain). For alloy 2195 the solvus line is located at a temperature of ~480° C., hereafter referred to as the solvus temperature. Correlation with a typical thermo-mechanical profile permits identification of the temperature regimes in which microstructural changes are implemented, SHT (~510° C.) is conducted in the quasi-single phase region (non Cu-containing precipitates, such as $Al_3Zr$, are not included), Recrystallization heat treatments (~490° C.) are conducted in the proximity of the solvus temperature, and hot working operations at temperatures (400-475° C.) just below the solvus temperature. And conventional recovery annealing heat treatments are conducted in the 250-400° C. temperature range, well below the solvus temperature.

The Alcan approach involved the application of prolonged anneals (≤72 hrs) at temperatures close to the SHT temperature. The particle pinning approach was adopted and the aim was to modify the size and distribution of $Al_3Zr$ dispersoids. The 'annealing' temperature was necessarily high because $Al_3Zr$ is a high melting point phase and is thus very stable. The stability of the dispersoids also necessitated the very long annealing times to affect modifications. The Alcan approach was considered applicable to post-FSW thermal processing only, because exposure of deformed weldments to such temperatures would obviously cause AGG. In order to determine effective IAT conditions for the 2195 alloy, the temperature selected would have to be higher than the conventional temperature regime, but lower than that at which AGG was observed. As a consequence, the Alcoa work was used to define the upper and lower limits for the effective IAT temperature, and the Alcan work was used to define the limits for the effective IAT time. In certain preferred embodiments, the effective IAT temperature is just below a solvus line on the phase diagram for the particular aluminum alloy of interest. It, an alloy enters a (quasi)single phase region on the phase diagram, which is where the above Alcan approach appears to target. Without wishing to be bound by any one particular theory, the inventors believe that partial dissolution of soluble second phase particles plays a role in the success of the IAT treatment, generally at temperatures lower than a solvus line, which is in contrast to the Alcan approach that appears to address the size and distribution of insoluble particles. In an embodiment, the IAT temperature may be less than 50° C. below the SHT temperature, less than 25° C. below the solvus temperature, and the duration of the IAT may be 48-72 hours. As an example, the SHT temperature may be 510° C., the solvus temperature may be 480° C., the IAT temperature may be 470° C., and the IAT duration may be at least 48 hours (e., 48 hours, 48~72 hours, 72 hours, etc.).

AGG tends to occur rapidly and the rate is more sensitive to temperature than heating rate because it is purely a growth process. The conventional approach to refining grain size by using fast heating rates to promote the nucleation of new grains is not directly applicable. The approach adopted in this study combined traditional processing protocols with the concepts introduced by Humphreys. Therefore, the technical objective of the IAT was to reduce the stored energy through recovery and grain growth (rather than primary recrystallization during subsequent SHT). The inventors expected that a threshold temperature, below which AGG did not occur, existed in the material of interest, i.e. $T_{AGG}$. Annealing would have to be performed below $T_{AGG}$, and that this threshold would be affected by alloy composition, welding parameters employed and the level of forming strain. In contrast to discontinuous grain growth (understood to be behind AGG), continuous grain growth (CGG) is a competitive growth mechanism, i.e. all grains within the array are expanding concurrently. Consequently, CGG is the slowest grain growth process and requires prolonged annealing times for appreciable microstructural coarsening to occur.

In some embodiments of the invention, a deformation step is conducted upon the aluminum alloy article, which may be performed using spin forming deformation where appropriate (typically for plate thicknesses greater than about 0.25 inches) or by performing superplastic deformation (typically for sheet products with thickness less than about 0.25 inches) under suitably effective conditions. In other embodiments of the invention, the high temperature superplastic deformation step essentially performs the same role that SHT does in 2xxx alloys, i.e. that the second phase particles are believed to dissolve at lower temperatures.

For ease of reference, one aluminum alloy will continue to be discussed in detail, however, it should be further understood that the invention is not meant to be unduly restricted to any particular alloy, its associated processing conditions, or its resulting article or application. Accordingly, Aluminum Alloy 2195 has the nominal composition of Al-4.0Cu-1.0Li-0.4Mg-0.4Ag-0.1Zr (wt. %), and the material starts as O temper plate. The thermo-mechanical processing history of the material used in this study is outlined in FIG. 1, which represents known art. Fabrication comprises two large plates being friction stir welded together, followed by a stress relief annealing treatment. A circular blank is then contour machined, with radial thickness varying from the centre (pole) to the perimeter (rim). Subsequently, the blank is spin-formed in to a hemispherical dome with an approximately uniform gage. In the hemispherical dome produced, the forming strain introduced varies from the pole, across the membrane, to the rim. As part of this study, the last stage of manufacturing is to expose the whole fabricated component to high solution heat treatment (SHT) temperatures during T8 tempering (including cold stretching and aging steps) for service properties. The IAT of the instant invention was conceptualized in at least some embodiments of the present invention to be targeted for insertion after the SFD and before the SHT phase of the processing.

The AGG which occurred in the friction-stir welded 2195 material processed with the known art here is highlighted in FIG. 2, where a comparison of the butt weld nugget microstructure before and after conventional T8 tempering is presented. The orientation of the full-penetration weld with respect to the dome is indicated. The accompanying schematic shows the approximate location of the weld nugget with respect to the starting plate dimensions. As a consequence of prior machining and forming, the thickness of the material comprises only 25% of the original friction-stir-welded cross-section. The micrographs reveal that a heavily deformed microstructure with indistinct features has been transformed into a coarse-grained structure during the SHT. The advancing interface between the weld nugget and the parent metal represents an abrupt change in microstructure in the FSW butt weld. It is evident that growth of a few large grains occurred in this vicinity, such that individual grain boundaries may extend through the entire thickness of the material.

Figure 3:
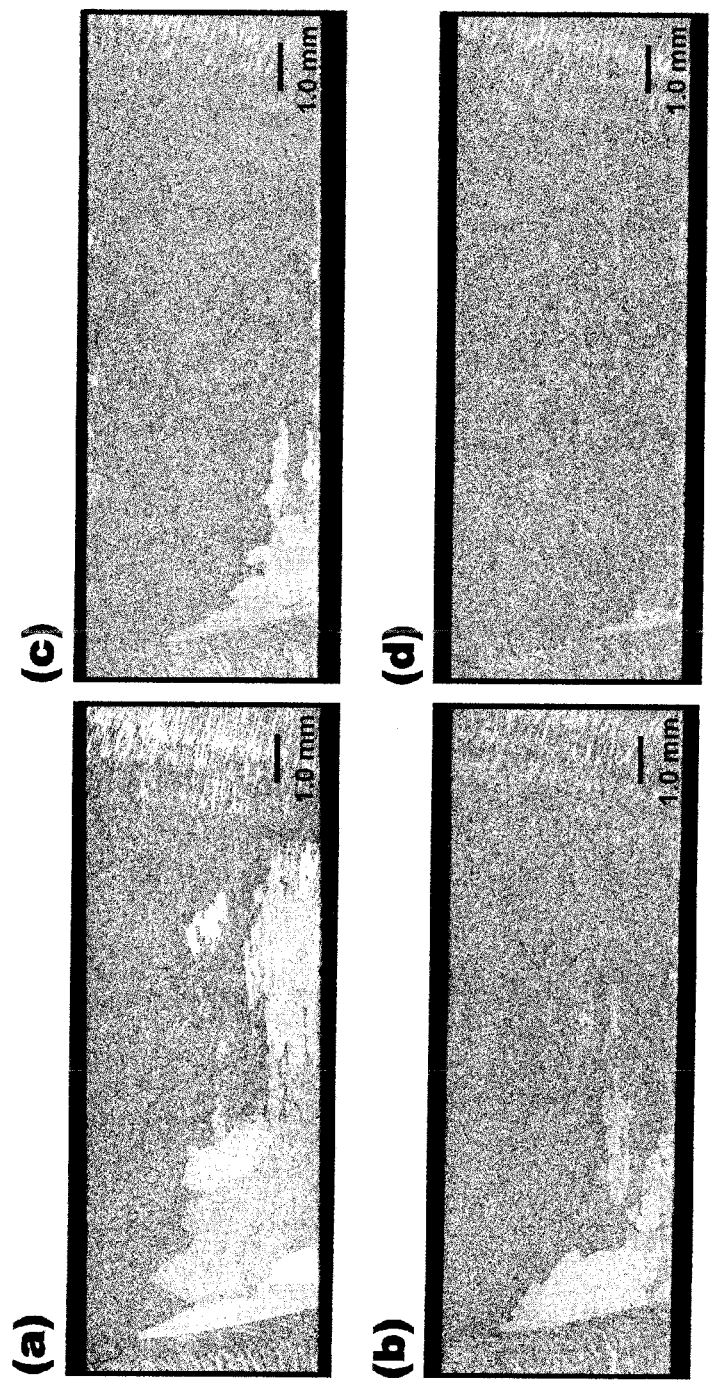

The reduction in AGG in the SFD/FSW weld nugget achieved by the instant invention is illustrated, for example, in FIG. 3. It demonstrates that modification of T8 processing by simply inserting an IAT can be effective. Annealing temperatures and times were adjusted and the extent of AGG was progressively reduced. The IAT design philosophy concentrated on reducing the driving force to prevent initiation, rather than increasing the retarding force to inhibit propagation of AGG. Therefore, the recovery annealing treatment was designed to modify the existing grain structure, rather than the size and distribution of second phase precipitates. The Humphreys model on cellular microstructures provides insight on the appropriate methodology for suppressing AGG. The differentials in grain size, grain boundary energy and/or mobility, between the unstable grains and the surrounding grains, must be reduced. As a consequence, it was hypothesized that the driving force for AGG during SHT would be removed by promoting continuous grain growth (CGG) during pre-SHT annealing. The resultant microstructural modifications should be manifested in detectable (sub)grain size/morphology changes. It was also surmised that this approach would be effective even in the presence of grain size gradients within the weld nugget microstructure. FIG. 3 also reveals that AGG was not suppressed entirely and remained adjacent to the intersection of the Advancing side with the weld Root side. It was deduced that the driving force for AGG was highest at this 'AR' location, with decreasing gradients extending out into the cross-section.

The following example further illustrates the invention but, of course, should not be construed as in any way limiting its scope.

EXAMPLE

This example further demonstrates the effectiveness of using IAT to suppress AGG.

Investigation of the (sub)grain structure was performed using standard Optical Metallography (OM), and Electron Back-Scattered Diffraction (EBSD) analytical techniques. Metallurgical analyses were conducted on the same samples for each of the analytical techniques. Traverses between the Advancing/Root and Retreating/Crown intersections were employed, i.e. 'AR to RC' traverses. The OM data was collected using two standard specimen preparation/imaging mode combinations; Keller's chemical etching/bright field (K/BF) images and Barker's electro-chemical etching/cross-polarized (B/XP) images. The smaller areas for each EBSD data set contained within were 250 μm×500 μm and comprised of 900-1400 (sub)grains, depending on dimensions. The Mean Linear Intercept (MLI) methodology used was in conformance with ASTM E112 procedures for the OM data and ASTM E2627 for the EBSD data. Boundaries with misorientations between 2° and 15° were categorized as belonging to subgrains, and greater than 15° as grain boundaries, during the EBSD analyses.

Figure 4:
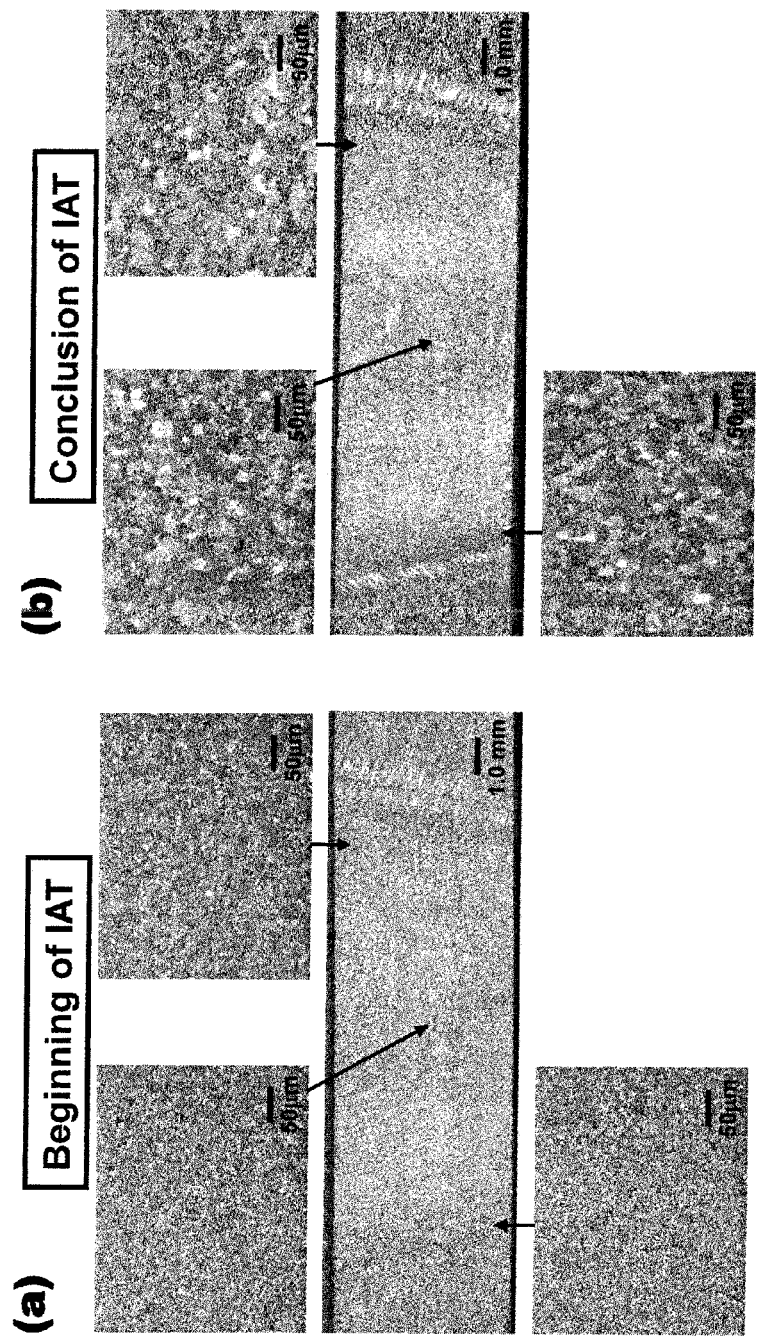

The effect of the IAT on the microstructural characteristics of the weld nugget is illustrated in the B/XP images in FIG. 4. A qualitative comparison of the two cross-sectional images reveals little discernible change in the microstructure. The overall grain structure appears fairly uniform and the concentric bands of grains constitute the onion ring features frequently observed. The periodic banding is most likely revealed by orientation contrast and grain alignment with material flow during the FSW process. The six higher magnification images show there has been some sharpening of the grain contrast during the IAT. The grain structure is fully recrystallized and the IAT has caused homogeneous coarsening across the weld nugget. The main feature is that there is evidence of a gradient in grain size along the 'AR to RC' traverse. This supported the notion that the level of strain and driving force for AGG is highest in this region of the nugget.

Figure 5:
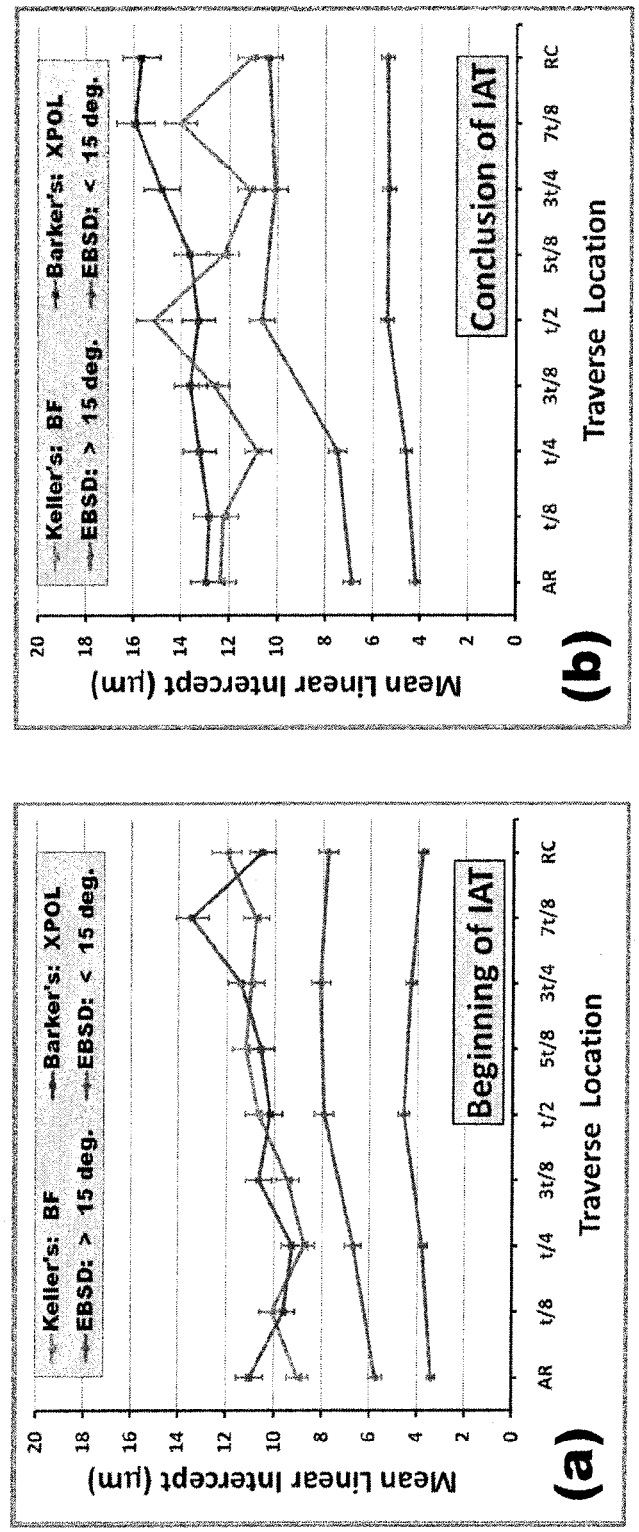

The apparent changes in (sub)grain size across the weld nugget resulting from the IAT are quantified in FIG. 5. The MLI data represent a combined average of the changes in the S and T dimensions along AR to RC traverses. The sizeable error bars are probably a consequence of the varying grain alignment observed in FIG. 4, i.e. the onion rings. The different analytical techniques do reveal different trends in (sub)grain size, both as a function of material condition and cross-sectional location. The general trend in the data is that the (sub)grain size increases during the IAT and there is also a discernible increase from the AR to RC locations. The OM data shows more fluctuations, whereas the EBSD data reveals a gradual, smoother increase along the traverse. The most consistent trend in the MLI data is that the (sub)grain size increases throughout the nugget during the IAT. The fluctuating physical alignment of (sub)grains is likely responsible for the data variability observed, rendering more detailed assessment difficult.

Figure 6:
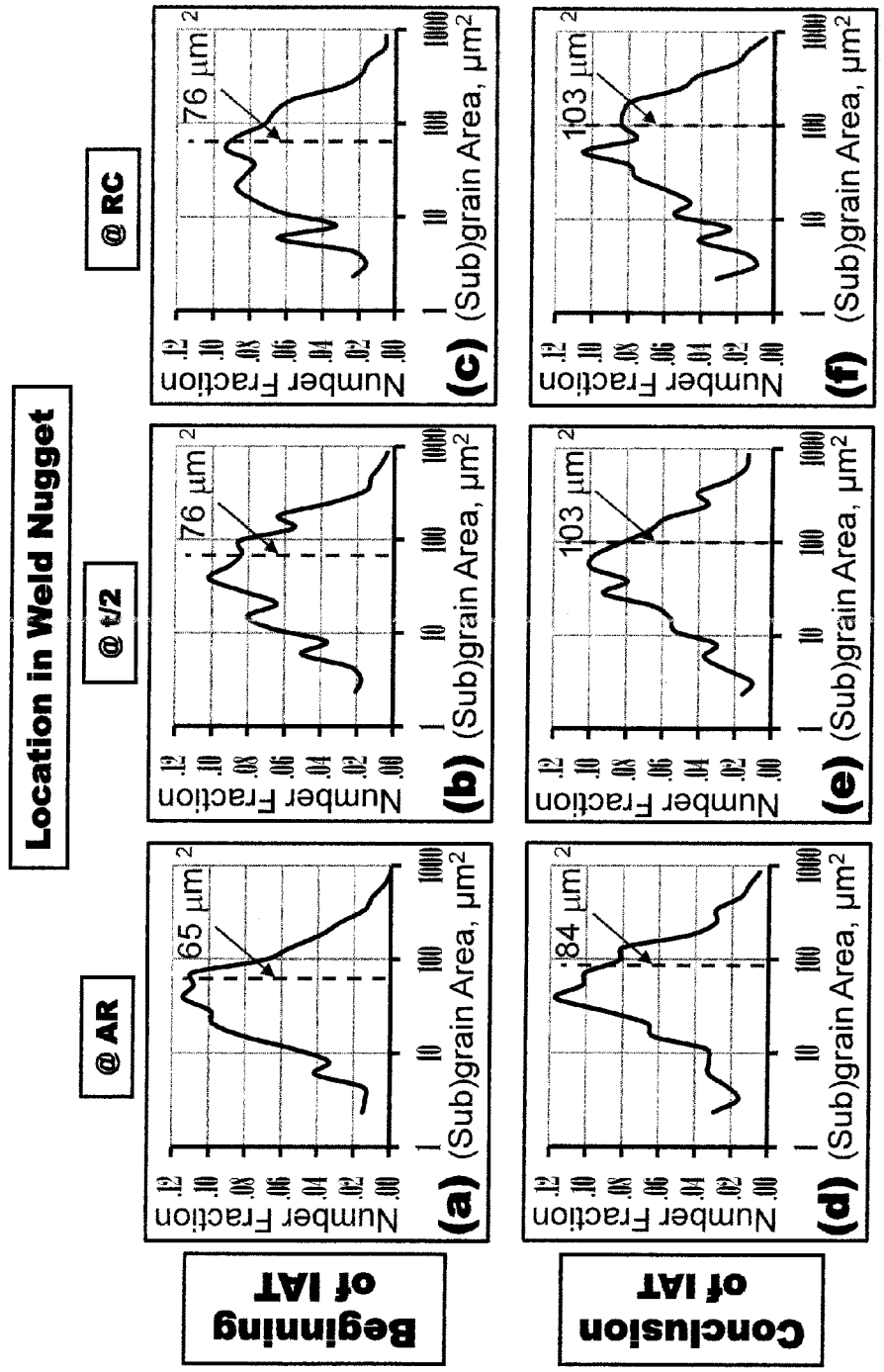
FIG. 6 shows an exemplary comparison of the (sub)grain area distribution at the beginning and conclusion of the IAT, as a function of location across the weld nugget. Note the log-normal shape throughout and the ≥30% increase in the average grain area during the IAT.

The results of using the EBSD data to examine changes in (sub)grain areas during the IAT are presented in FIG. 6. This was performed in order to further affirm the nature of the microstructural coarsening observed across the weld nugget. The effect on the data presented above of the varying physical orientation of grains within the onion rings was eliminated by assessing grain area instead. The data reveal that the grain area is approximately log-normal in nature and does not change with location across the weld nugget. During the IAT, there has been an overall increase in grain area of 30% at AR, 36% at t/2 and 36% at the RC locations. Therefore, it may be concluded that the weld nugget microstructure has coarsened in a uniform manner within the cross-section.

The OM results give a broad perspective on the changes in grain structure by using two etching/imaging combinations. The size of the images was such that the area sampled was contiguous along the diagonal traverse of the weld nugget. It was expected that the subtleties in grain contrast produced by the B/XP combination would create differences in the boundaries detected compared with K/BF. The complementary EBSD results show the changes in (sub)grain size/morphology for all of the boundaries present, but from much smaller sampling areas. The 'grain' size will only depend on the boundary misorientation threshold selected. In both cases, the data population was sufficiently large to be considered 'statistically significant'. It was expected that the S- and T-oriented MLI data would be affected by the bands of aligned grains. The grain size/morphology data become progressively less accurate as elongated grains are inclined toward 45° (from the vertical or horizontal). This is likely to be most prevalent at the mid-weld locations due to the passage of the FSW tool through the material.

Figure 7:
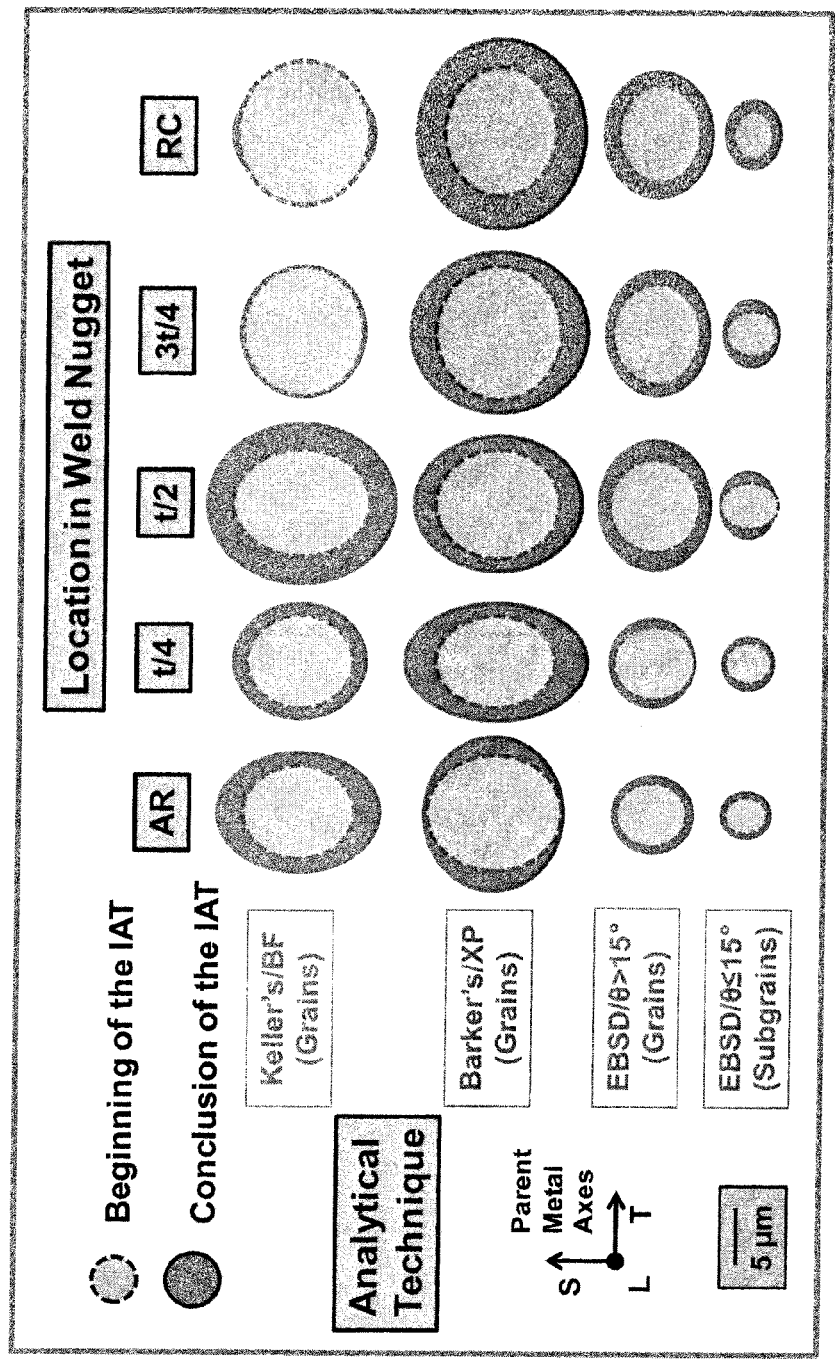
FIG. 7 represents an exemplary scaled drawing showing the changes in grain and subgrain size/morphology during the IAT, as function of location in the weld nugget.

The scaled drawing in FIG. 7 illustrates how the size and morphology of representative gains and subgrains across the weld nugget are affected by the IAT. The AR, t/4, t/2, 3t/4, and RC locations are represented in the columns. The uniform increases in (sub)grain dimensions and areas noted at most of the locations suggests homogeneous microstructural coarsening. The lack of large morphological changes further suggested that coarsening of the microstructure as a whole has occurred via a continuous grain/subgrain growth process. The location-dependent variations in size and morphology highlight the presence of microstructural heterogeneities. Again, the variability is related to grain alignment with material flow during the FSW process. Consequently, the (sub)grain size gradients remain the same or increase, whereas the (sub)grain morphology gradients fluctuate from AR to RC.

The approach adopted in this investigation culminated in a greater than about 90% reduction in the area fraction of AGG in the FSW weld nugget. The core of the IAT design is based on the application of existing microstructural stability concepts to Al—Li alloy materials. Current models indicate that AGG can be suppressed if the differential in grain size between the isolated, unstable grains and the surrounding matrix grains can be eliminated. It is evident that promoting continuous grain growth at a temperature below which the microstructure is stable contributes to a reduction in the driving/retarding force differential for AGG. In this case, one aspect was reduction of the net driving force for initiation of AGG in a post-FSW/SFD material. The generation of statistically significant data by EBSD analyses validated several theories on microstructural development. The data are consistent with a decrease in total grain boundary area resulting in a decrease in stored energy and a reduction in the driving force. However, uniform microstructural coarsening during the pre-SHT recovery anneal may contribute to AGG suppression, but it may not be solely responsible for stabilizing the microstructure during SHT.

The insertion of a recovery annealing treatment after SFD and before SHT is effective in suppressing AGG during SHT. The data presented reveal that a simple IAT has caused continuous grain (and subgrain) growth throughout the FSW weld nugget cross-section. The average increase in grain size across the weld nugget cross-section was greater than or equal to about 30% by area. It is recognized that this research effort constitutes a case study, and the results are specific to alloy composition, the FSW and SFD parameters employed, and level of forming strain. The annealing time and temperature for the IAT will be dependent on these variables when applied to other material conditions. The experimental philosophy adopted here may be applied to other friction-stir-welded commercial Al alloys. The approach is particularly pertinent to materials which have undergone (or may be subjected to) post-welding deformation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for suppressing abnormal grain growth in welded aluminum alloys comprising:
   (a) providing an article comprising an aluminum alloy;

(b) friction-stir-welding the article under effective friction-stir-welding conditions;
(c) inserting an intermediate annealing treatment ("IAT") using an inert gas after the welding step on the article under effective intermediate annealing conditions, wherein the IAT is performed at a temperature of 470° C. for at least 48 hours and the inert gas is selected from the group consisting of nitrogen, noble gases, and combinations thereof lower than a solvus line on a phase diagram for the aluminum alloy;
(d) conducting solution heat treatment on the article under effective solution heat treatment conditions immediately after the IAT; and
(e) recovering the article characterized with greater than about 90% reduction in area fraction abnormal grain growth in any friction-stir-welded nugget.

2. The process of claim 1, wherein the aluminum alloy comprises 2xxx series material.

3. The process of claim 1, wherein the aluminum alloy comprises 7xxx series material.

4. The process of claim 1, further comprising the step of conducting deformation on the article under effective spin-forming deformation conditions or under effective superplastic deformation conditions.

5. The process of claim 1, wherein the friction-stir-welding step further includes a step of stress relief annealing and a step of contour machining.

6. The process of claim 1, wherein the solution heat treatment step further includes a step of cold stretching and a step of aging of the article.

7. A process for suppressing abnormal grain growth in welded and deformed aluminum alloys comprising:
(a) providing an article comprising an aluminum alloy;
(b) friction-stir-welding the article under effective friction-stir-welding conditions;
(c) conducting deformation on the article under effective spin-forming deformation conditions or under effective superplastic deformation conditions;
(d) inserting an intermediate annealing treatment ("IAT") using an inert gas after the deformation step on the article under effective intermediate annealing conditions comprising an effective time period of at least 48 hours and an IAT temperature of 470° C., wherein the inert gas is selected from the group consisting of nitrogen, noble gases, and combinations thereof lower than a solvus line on a phase diagram for the aluminum alloy;
(e) conducting solution heat treatment on the article under effective solution heat treatment conditions immediately after the IAT; and
(f) recovering the article characterized with greater than about 90% reduction in area fraction abnormal grain growth in any friction-stir-welded nugget.

8. The process of claim 7, wherein the aluminum alloy comprises 2xxx series material.

9. The process of claim 7, wherein the aluminum alloy comprises 7xxx series material.

* * * * *